March 2, 1965 K. CARRARO 3,171,177
CONVEYOR AND TRANSMISSION BELT CONNECTION
Filed Jan. 28, 1963 2 Sheets-Sheet 1
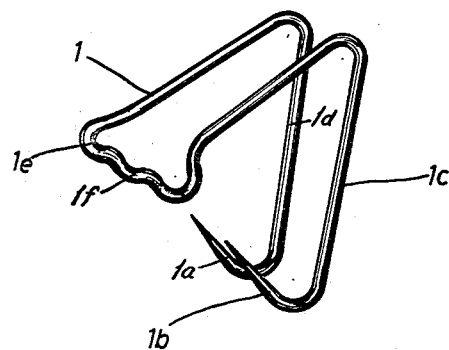
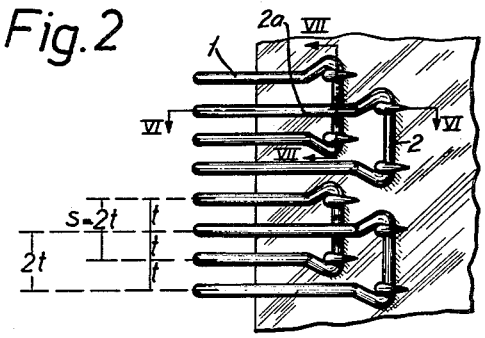
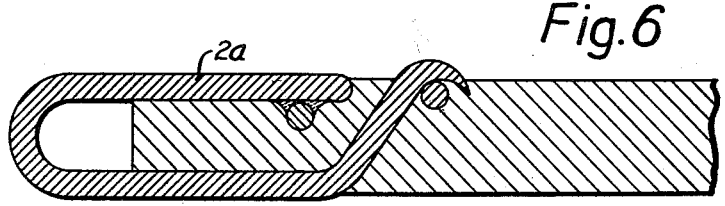
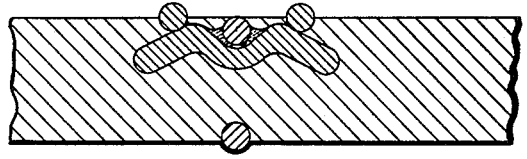

United States Patent Office 3,171,177
Patented Mar. 2, 1965

3,171,177
CONVEYOR AND TRANSMISSION BELT CONNECTION
Kurt Carraro, Haan, Rhineland, Germany, assignor to Hans Ziller, Millrath uber Hochdahl, Germany
Filed Jan. 28, 1963, Ser. No. 254,193
Claims priority, application Germany, Jan. 31, 1962, Z 9,207
9 Claims. (Cl. 24—33)

The present invention relates to a conveyor belt and transmission belt connection by means of hooks and the like in which the hooks engage the belt ends to be connected alternately at different distances from the belt ends so that the belts are penetrated by the hooks along at least two lines.

With heretofore known connections of this type, single hooks in contrast to double hooks were employed which were in most instances rather difficult to apply. Also double hooks are known in which the two ground hook points after penetrating the belt are pressed around a broadened ear transverse member. The pressing in of these belt connections is carried out by means of hooks with specially shaped guiding surfaces, and the pressing operation is performed in two or more pressing steps so that a good and solid anchoring of the wire hooks in the belt will be effected. In connection with such belt connections, double hooks have been suggested with which the distance of the two legs from each other corresponds to the pressing-in pitch of the hooks.

For purposes of avoiding too great a perforation of the belt ends, it is also known to make one leg of a double hook longer than the other leg and to design the outer connecting section at an angle with regard to the belt edge in conformity with the different lengths of the legs. Such an arrangement brings about that the perforation points are distributed over a wider strip in the belt end thereby eliminating the danger of tearing off the belt end.

All of the above mentioned heretofore known connections merely meet the requirement of a double hook firmly anchored in the belt end portions without, however, affording a good exploitation of the pitch of the individual double hooks. The less the pitch of a hook connection, the more supporting hook legs can be employed for aiding in the pulling force of the belt.

It is, therefore, an object of the present invention to provide a conveyor and transmission belt connection which will make it possible to press into the belt width a maximum of hook legs which properly distributing the belt perforations.

It is another object of this invention to provide a belt connection as set forth in the preceding paragraph which will assure the arrangement of the belt perforations along at least two lines.

These and other objects of the invention will appear more clearly from the following specification in connection with the accompanying drawings, in which:

FIG. 1 is a perspective view of a short double hook employed in connection with the present invention.

FIG. 2 shows a portion of a belt connection in which one leg of the longer hook passes above the transverse hook section or yoke of the adjacent shorter hook.

FIG. 6 is a section taken along the line VI—VI of FIG. 2.

FIG. 7 is a section taken along the line VII—VII of FIG. 2.

Figure 3:
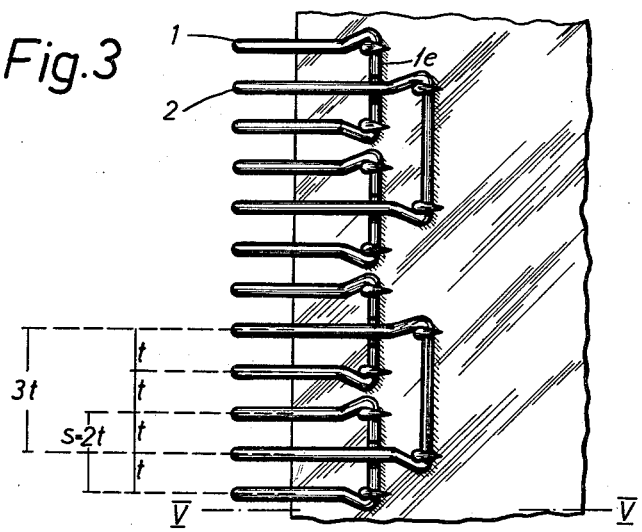
FIG. 3 illustrates an arrangement in which each leg of the longer hook passes over the transverse hook section or yoke of the respective adjacent shorter hook.

The belt connection according to the present invention is characterized primarily in that with the employment of double hooks known per se the transverse connecting section or arm of the shorter hook is passed over by at least one leg of an adjacent longer hook. The distance of the legs of the double hooks corresponds to a multiple of the pressing-in pitch. Also the distance of the legs of the shorter hook from the legs of the longer hook corresponds to the pitch. In this way, with a minimum pitch, there will be obtained not only a customary simple pressing in of the double hook and laying over of the hook point around a straight transverse path, but the perforation points will also be well distributed over at least two lines.

According to one practical embodiment of the present invention, the transverse connecting section of the shorter hook is entirely or partially cranked or depressed so that the adjacent leg of the adjacent longer hook can pass this transverse connecting member without protruding too much from the belt plane.

According to a particularly advantageous embodiment of the invention, the legs of the longer double hook are firmly connected to the transverse connecting member of the respective adjacent shorter hook. Such connection may be effected for instance by welding. In this way, these hooks may be employed without an additional aligning wire or aligning strip. With this arrangement, the interconnected double hooks form a closed hook strip which in a customary manner can be placed into a pressing device for pressing into the respective belt end.

Referring now to the drawing in detail, the shorter double hook 1 is provided with preferably ground points 1a and 1b, while the legs 1c and 1d are interconnected by a transverse connecting section or yoke 1e. In addition to these shorter double hooks, there are also employed longer double hooks 2. These longer double hooks 2 may be arranged in such a way that for instance one of their legs 2a passes over the transverse connecting member 1e of the respective adjacent shorter hook as clearly shown in FIG. 2. Preferably the said transverse connecting section or yoke 1e is provided with a depression 1f (see FIG. 1) so that the leg 2a of the longer hook 2 will after being pressed into the belt end be located substantially in the same plane as the legs 1 of the respective adjacent shorter hook. As will be evident from FIGS. 6 and 7, the legs 2a of the longer hooks 2 are connected to the transverse connecting sections or yokes 1e by welding.

The distance between the legs of the shorter hook 1 and also between the legs of the longer hook 2 corresponds to a multiple of the pressing-in pitch $t$. With the embodiment according to FIG. 2, this distance $s$ equals $2t$. The hooks are so arranged that the distance between the legs of the shorter hook 1 from the legs of the longer hook 2 likewise corresponds to the pitch $t$ as clearly shown in FIG. 2.

FIG. 3 shows a section of a belt connection according to the invention in which always two double hooks with the distance $s$ equalling $2t$ are passed over by a further longer double hook with the pitch $3t$. Also with this embodiment, the transverse connecting member 1e of the shorter hook 1 is provided with a depression in which are received the legs of the longer hooks 2.

Figure 4:
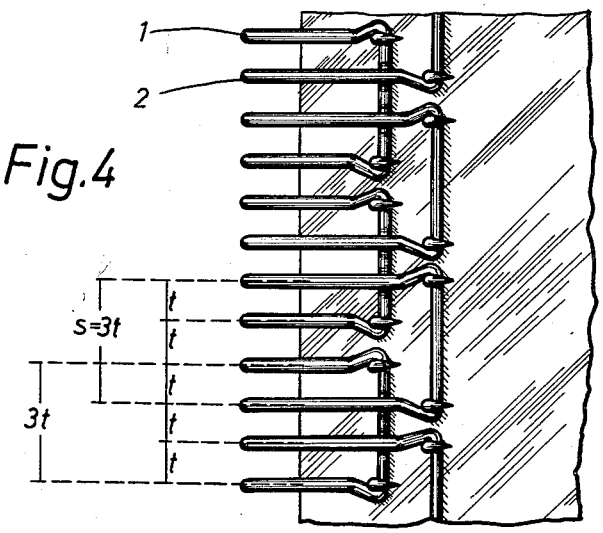
FIG. 4 shows a further modification of a belt connection according to the invention in which the transverse connecting section or yoke of the shorter hook is passed over by one leg each of two adjacent longer hooks.
Figure 5:
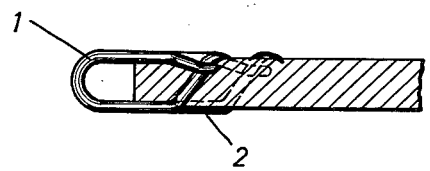
FIG. 5 is a cross section through a belt end, said section being taken along the line V—V of FIG. 5.

According to the embodiment of FIG. 4, exclusively double hooks are employed with a distance $s$ between the legs which equals $3t$. The legs of these double hooks pass over each other in such a way that without the employment of an aligning device they already form a closed hook strip when the legs of the longer hooks 2 are firmly connected to the respective transverse connecting member of the respective adjacent shorter hook. Such connection may be effected for instance by welding.

It is, of course, to be understood that the present invention is not limited to the particular embodiments shown in the drawings but also comprises any modifications within the scope of the appended claims. Thus, it is also possible to employ overlapping double hooks with a pitch of 2t, 3t or more in a different combination. Thus, for instance, it is possible in order further to disperse the perforation points, to arrange these perforation points in three or more lines one behind the other instead of arranging the same along two lines as shown in the drawings. In this way, a minimum pitch of the hook connection will be obtained. It is furthermore possible to arrange the longer double hooks with their two legs between the legs of the shorter double hooks.

What I claim is:

1. In combination with one end portion of an industrial belt: a first and a second set of connecting hooks, each hook of each of said sets of hooks having two legs extending in longitudinal direction of said belt end portion and also having a transverse section shorter than said legs and spacing said legs from each other while being integrally connected thereto, said transverse section of each of said hooks engaging one side of said belt end portion, said two legs of each of said hooks extending from the transverse hook section pertaining thereto on one side of said belt in close engagement therewith beyond the transversely extending edge of said one belt end portion and being bent so as to pass to the other side of said belt in close engagement therewith and through the belt with the free ends of said legs anchored on the transverse hook section pertaining thereto, the bends in all of the legs of all of said hooks of both sets of hooks being spaced by substantially the same distance from the transversely extending edge of said belt end portion, the legs of said second set of hooks being longer than the legs of said first set of hooks, and at least one leg of each of said second set of hooks being in engagement with and extending transverse to and above the respective adjacent transverse section of said first set of hooks.

2. An arrangement according to claim 1, in which the spacing between two legs of each hook of each set of hooks equals a multiple of the spacing between each two adjacent legs in transverse direction of the belt.

3. An arrangement according to claim 1, in which all adjacent legs are evenly spaced from each other in transverse direction of the belt, and in which the distance between a shorter leg and the adjacent longer leg of the two sets of hooks equals said spacing.

4. An arrangement according to claim 1, in which the legs of the hooks of said second set of hooks which extend over and transverse to the respective adjacent transverse hook section of the hooks of said first set of hooks are fixedly connected to the respective last mentioned transverse hook section.

5. An arrangement according to claim 1, in which each two adjacent legs respectively pertaining to two adjacent hooks of said second set of hooks pass over one and the same transverse hook section pertaining to the respective adjacent hook of said first set of hooks and are located between the legs connected to said last mentioned transverse hook section.

6. In combination with one end portion of an industrial belt: a first and a second set of hooks, each hook of each of said sets of hooks having two legs extending in longitudianl direction of said belt end portion and also having a transverse section shorter than said legs and spacing said legs from each other while being integrally connected thereto, said transverse section of each of said hooks engaging one side of said belt end portion and being provided with a depression toward said one side of said belt end portion, said two legs of each hook of each of said sets of hooks extending from the transverse hook section pertaining thereto on one side of said belt in close engagement therewith beyond the transversely extending edge of said one belt end portion and being bent so as to pass to the other side of said belt in close engagement therewith and through said belt with the free ends of said legs anchored on the respective transverse hook section pertaining thereto, the bends in all of the legs of all of said hooks of said two sets of hooks being spaced by substantially the same distance from the transversely extending edge of said belt end portion, the legs of the hooks of said second set of hooks being longer than the legs of the hooks of said first set of hooks, and one leg of each hook of said second set of hooks extending through said depression of and transverse to the respective adjacent transverse hook section while being fixedly connected to the said respective transverse hook section.

7. In combination with one end portion of an industrial belt: a first and a second set of hooks, each hook of each of said sets of hooks having two legs extending in longitudinal direction of said belt end portion and also having a transverse section shorter than said legs and spacing said legs from each other while being integrally connected thereto, said transverse section of each of said hooks engaging one side of said belt end portion and being provided with two depressions spaced from each other in longitudinal direction of said transverse hook section, said two legs of each hook of each set of hooks extending from the transverse hook section pertaining thereto on one side of said belt in close engagement therewith beyond the transversely extending edge of said one belt end portion and being bent so as to pass to the other side of said belt in close engagement therewith and through the belt with the free ends of said legs anchored on the transverse hook section pertaining thereto, the bends in all of the legs of all of said hooks of said two sets of hooks being spaced by substantially the same distance from the transversely extending edge of said belt end portion, the legs of the hooks of said second set of hooks being longer than the legs of said hooks of said first set of hooks, and the adjacent legs of each two adjacent hooks of said second set of hooks respectively passing through said depressions and transverse to the respective adjacent transverse hook section of the hooks of said first set of hooks.

8. In combination with one end portion of an industrial belt: a first and a second set of connecting hooks, each hook of each of said sets of hooks having two legs extending in longitudinal direction of said belt end portion and also having a transverse section shorter than said legs and spacing said legs from each other while being integrally connected thereto, said transverse section of each of said hooks engaging one side of said belt end portion, said two legs of each of said hooks extending from the transverse hook section pertaining thereto on one side of said belt in close engagement therewith beyond the transversely extending edge of said one belt end portion and being bent so as to pass to the other side of said belt in close engagement therewith and through the belt with the free ends of said legs anchored on the transverse hook section pertaining thereto, the bends in all of the legs of all of said hooks of both sets of hooks being spaced by substantially the same distance from the transversly extending edge of said belt end portion, the legs of said second set of hooks being longer than the legs of said first set of hooks, the legs of each hook of said second set of hooks being so arranged that one leg extends over and transverse to the respective adjacent transverse hook section of said first set of hooks between the two legs pertaining to the respective transverse hook section while the other leg of each hook of said second set of hooks is located between two adjacent legs respectively pertaining to two adjacent hooks of said first set of hooks.

9. In combination with one end portion of an industrial belt: a first and a second set of connecting hooks, each hook of each of said sets of hooks having two legs extending in longitudinal direction of said belt end portion and also having a transverse section shorter than said legs and spacing said legs from each other while being integrally connected thereto, said transverse section of each of said hooks engaging one side of said belt end portion, said two legs of each of said hooks extending from the transverse hook section pertaining thereto to one side of said belt in close engagement therewith beyond the transversely extending edge of said one belt end portion and being bent so as to pass to the other side of said belt in close engagement therewith and through the belt with the free ends of said legs anchored on the transverse hook section pertaining thereto, the bends in all of the legs of all of said hooks of both sets of hooks being spaced by substantially the same distance from the transversely extending edge of said belt end portion, the legs of said second set of hooks being longer than the legs of said first set of hooks, the legs of each hook of said second set of hooks being so arranged that each hook of said second set of hooks has its transverse hook section extending parallel to and in spaced relationship to the transverse hook sections of two adjacent hooks of said first set of hooks with the legs of the respective hook of said second set of hooks respectively extending above and transverse to the transverse hook section of the respective adjacent two hooks of said first set of hooks.

References Cited in the file of this patent

UNITED STATES PATENTS

| | | |
|---|---|---|
| 1,163,780 | Schneider | Dec. 14, 1915 |
| 2,912,732 | Stoly et al. | Nov. 17, 1959 |

FOREIGN PATENTS

| | | |
|---|---|---|
| 324,248 | Italy | Jan. 25, 1935 |